United States Patent
Kaji et al.

(10) Patent No.: US 6,366,842 B1
(45) Date of Patent: Apr. 2, 2002

(54) POWER STEERING APPARATUS

(75) Inventors: Hiroaki Kaji, Yamatokooriyama; Masahiko Sakamaki, Yao, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/284,138

(22) PCT Filed: Aug. 13, 1997

(86) PCT No.: PCT/JP97/02830

§ 371 Date: Apr. 13, 1999

§ 102(e) Date: Apr. 13, 1999

(87) PCT Pub. No.: WO99/08921

PCT Pub. Date: Feb. 25, 1999

(51) Int. Cl.$^7$ .......... A01B 69/00; B62D 11/00; B62D 5/04
(52) U.S. Cl. .......... 701/41; 701/43; 180/443; 180/446; 180/422; 180/423; 180/410
(58) Field of Search .......... 701/41, 43; 180/443, 180/444, 445, 446, 422, 423, 410

(56) References Cited

U.S. PATENT DOCUMENTS

| | | | | |
|---|---|---|---|---|
| 4,753,309 A | * | 6/1988 | Marumoto et al. | 180/79.1 |
| 5,541,841 A | * | 7/1996 | Tanaka | 701/41 |
| 5,564,516 A | * | 10/1996 | Nimblett et al. | 180/423 |
| 5,600,559 A | * | 2/1997 | Nishimoto et al. | 701/41 |
| 5,711,394 A | * | 1/1998 | Fujii et al. | 180/422 |
| 5,761,627 A | * | 6/1998 | Seidel et al. | 701/41 |
| 5,786,674 A | * | 7/1998 | Kress et al. | 318/268 |
| 6,144,909 A | * | 11/2000 | Sakamaki et al. | 701/41 |

FOREIGN PATENT DOCUMENTS

| | | |
|---|---|---|
| JP | 57-140276 A | 8/1982 |
| JP | 63-219479 A | 9/1988 |
| JP | 63-219746 A | 9/1988 |
| JP | 04-46984 U | 4/1992 |
| JP | 08-230706 | 9/1996 |

* cited by examiner

Primary Examiner—Jacques H. Louis-Jacques
Assistant Examiner—Brian J. Broadhead
(74) Attorney, Agent, or Firm—Rabin & Berdo

(57) ABSTRACT

A motor is stopped when a steering angular speed is not greater than a stop threshold VS and a motor electric current value Im is kept within a motor stop range ΔI for a predetermined time period. The value of a steering torque increases as the motor electric current value Im increases. Therefore, the motor can assuredly be stopped when the steering torque is small. Further, when the motor is off, the sensitivity for motor actuation with respect to a change in the steering angle is set higher as the value of the steering angle increases.

4 Claims, 8 Drawing Sheets

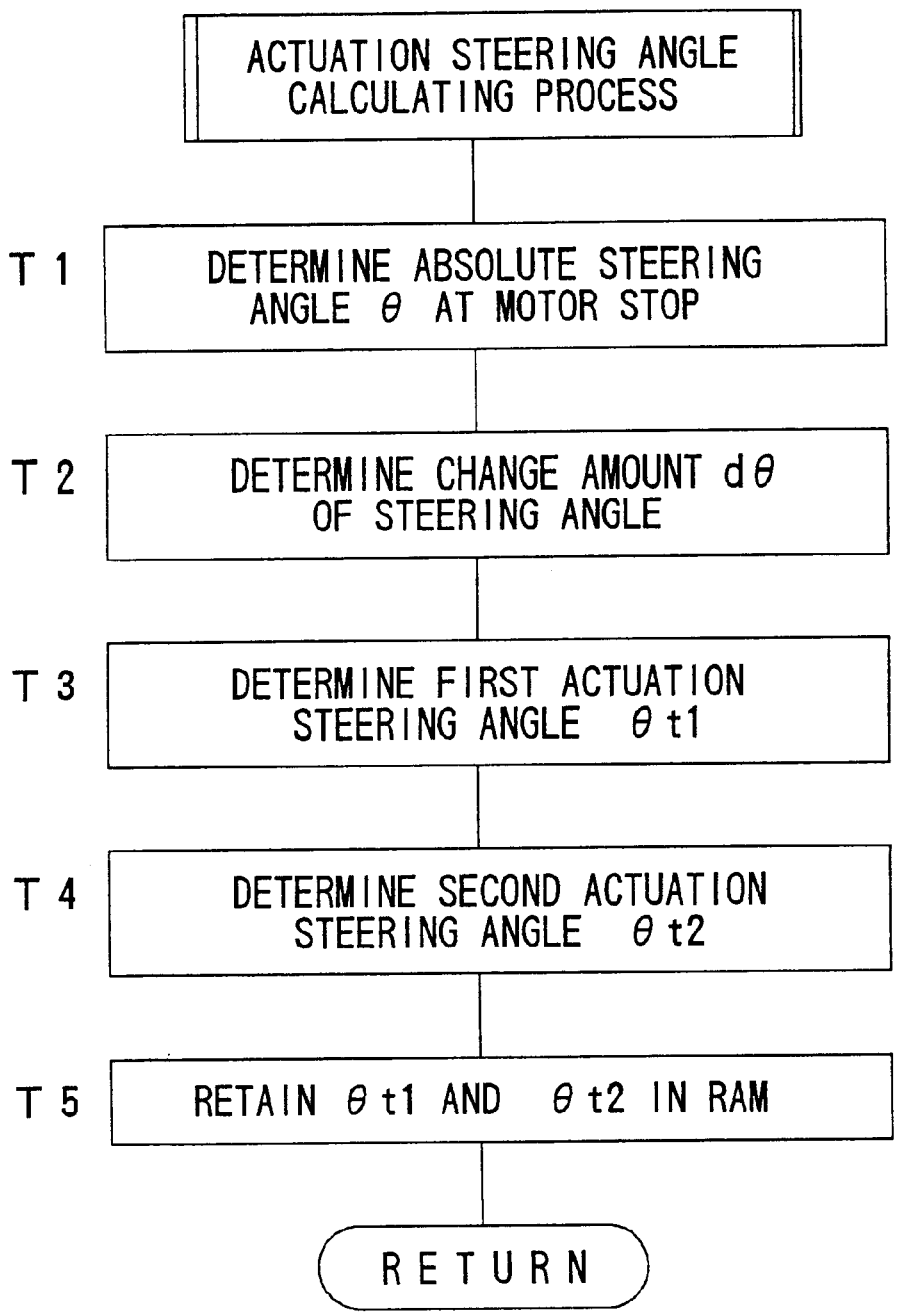

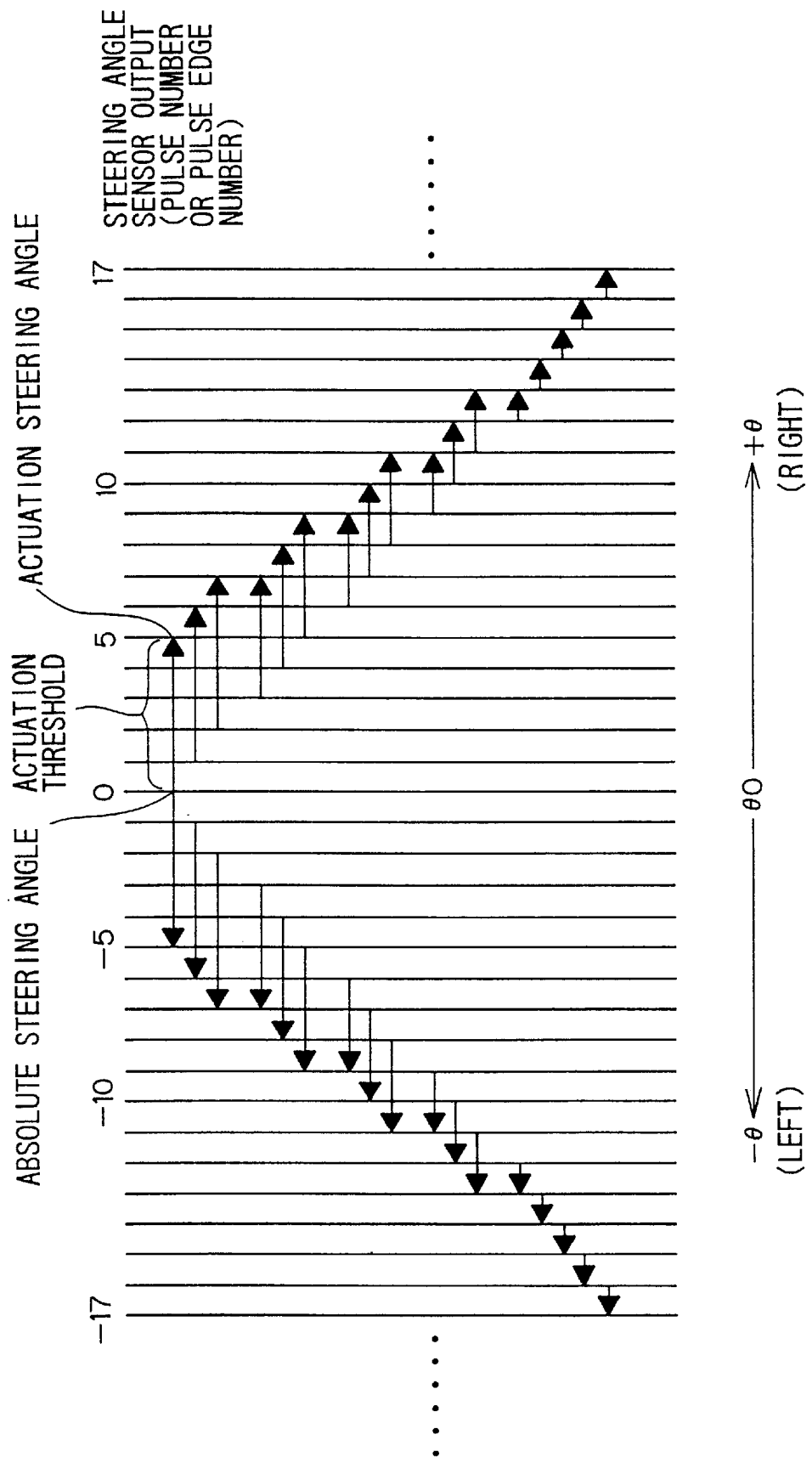

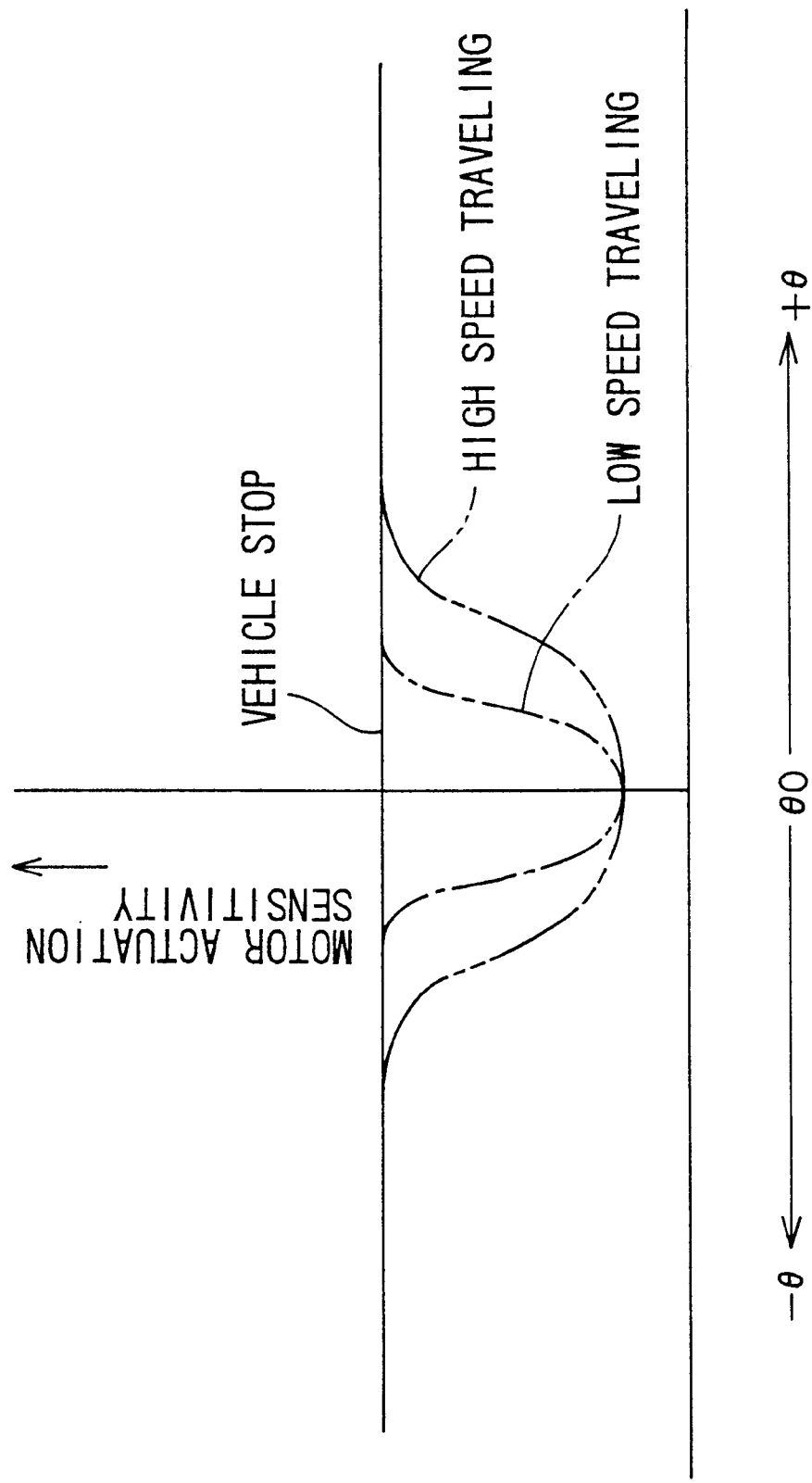

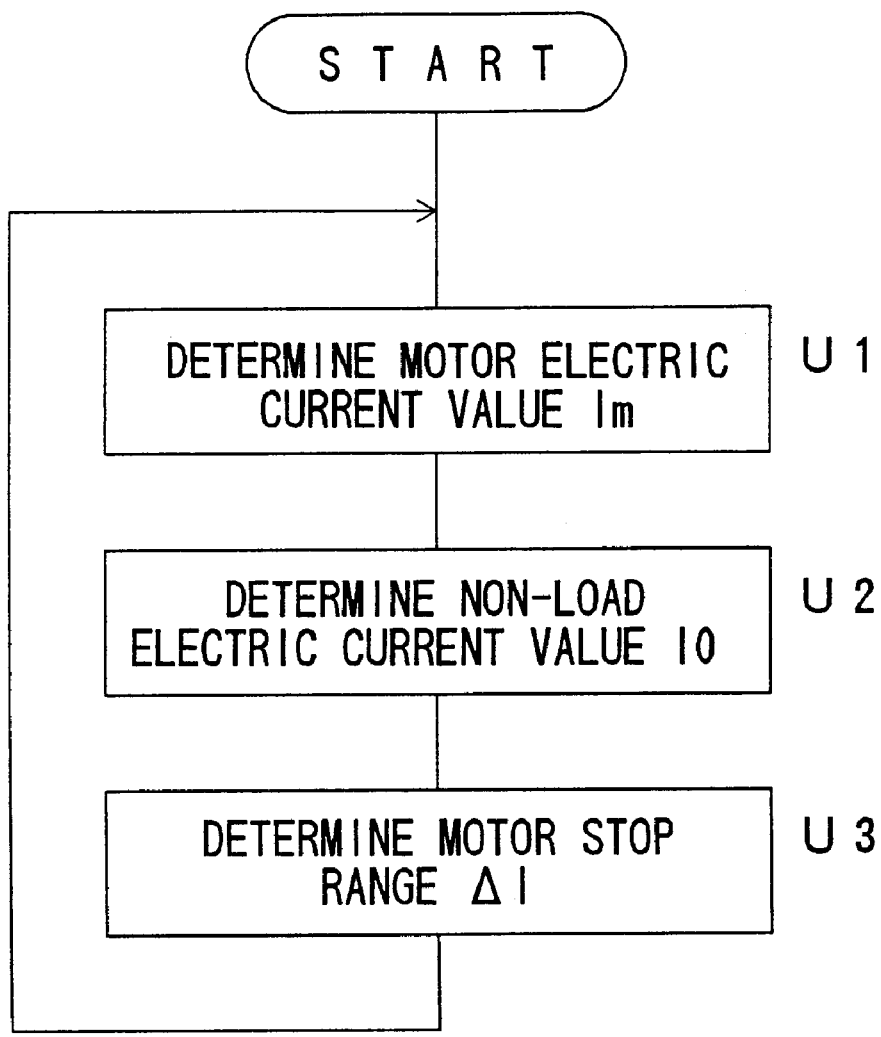

POWER STEERING APPARATUS

TECHNICAL FIELD

The present invention relates to a power steering apparatus which applies a steering assist force to a steering mechanism of a motor vehicle by a hydraulic pressure generated by a pump driven by an electric motor.

BACKGROUND ART

Power steering apparatuses are known which assist operation of a steering wheel of a motor vehicle by supplying a working oil from an oil pump to a power cylinder coupled to a steering mechanism. The oil pump is driven by an electric motor, and a steering assist force is generated by the power cylinder in accordance with the resolutions per minute (rpm) of the electric motor.

Drive control of the electric motor is performed, for example, on the basis of the steering angle of the steering wheel. That is, the steering angle is determined on the basis of an output of a steering angle senior provided in association with the steering wheel, and the driving of the electric motor is controlled on the basis of the steering angle. More specifically, if the steering angle of the steering wheel is within a motor stop range defined around a steering angle midpoint, steering assist is considered to be unnecessary, so that the electric motor is stopped. On the other hand, if the steering angle of the steering wheel is out of the motor stop range, the electric motor is driven to generate a steering assist force.

Detection of the steering angle midpoint is achieved, for example, by sampling steering angle data outputted from the steering angle sensor and regarding the most frequent steering angle data as corresponding to the steering angle midpoint.

However, the power steering apparatus described above performs the drive control of the electric motor with the use of the steering angle sensor, so that the drive control cannot be performed on the basis of the steering torque. Therefore, the sense of steering control is not satisfactory to the driver.

Where a motor vehicle travels along a straight road inclined transversely of the vehicle, for example, a torque should be applied to the steering wheel for stabilization of the vehicle even though the steering angle of the steering wheel is small enough to be within the motor stop range. In such a case, the aforesaid power steering apparatus does not provide the steering assist even under application of the steering torque. Hence, the sense of steering control for the driver is deteriorated.

A torque sensor may be used instead of the steering angle sensor to perform the drive control in accordance with the steering torque. However, the use of the torque sensor is not preferable, because the torque sensor is less reliable than the steering angle sensor.

DISCLOSURE OF THE INVENTION

It is an object of the present invention to provide a power steering apparatus which can ensure an improved sense of steering control for the driver.

It is another object of the present invention to provide a power steering apparatus which is capable of controlling driving of an electric motor in accordance with a steering torque to properly provide steering assist without the need for a torque sensor.

It is further another object of the present invention to provide a power steering apparatus which can ensure enhancement of energy saving.

A power steering apparatus of the present invention, which is adapted to generate a steering assist force by a hydraulic pressure generated by a pump driven by an electric motor, comprises: steering angular speed detecting means for detecting a steering angular speed; electric current detecting means for detecting the value of motor current flowing through the electric motor; and stop controlling means for stopping the electric motor in response to duration of a predetermined time period during which the steering angular speed detected by the steering angular speed detecting means is kept at a value that does not exceed a predetermined stop threshold and the motor electric current value detected by the electric current detecting means is kept within a predetermined motor stop range.

The motor current value of the electric motor varies depending upon a load applied to the motor, i.e., a steering torque. Therefore, when a relatively large steering torque is applied to a steering mechanism, the electric current value of the electric motor is relatively high even if the steering angle has a value close to a steering angle midpoint. In such a case, the electric motor is not stopped in accordance with the present invention. Since the electric motor can be driven when a steering torque is applied, the driving of the electric motor can be controlled according to the steering torque even without the torque sensor. Thus, the sense of steering control for the driver is improved.

In accordance with one embodiment of the present invention, the power steering apparatus further comprises: non-load electric current value calculating means for determining, on the basis of the motor electric current value detected by the electric current detecting means, a non-load electric current value which corresponds to a motor electric current value observed when the electric motor is in a non-load state; and motor stop range determining means for determining the motor stop range on the basis of the non-load electric current value determined by the non-load electric current value calculating means.

When the steering torque is zero, the electric motor is in the non-load state. Therefore, it is considered that, when the motor electric current value is within a predetermined range around the non-load electric current value, the steering torque is virtually zero, so that no steering assist is required. By determining the motor stop range on the basis of the non-load electric current value, stop control of the motor can properly be performed.

The motor stop range determining means is preferably adapted to determine, as the motor stop range, a range defined between the non-load electric current value and a value obtained by adding a predetermined electric current threshold to the non-load electric current value.

The electric current threshold is preferably determined on the basis of a torque range where a motor vehicle equipped with the power steering apparatus requires no steering assist.

Another power steering apparatus of the present invention, which is adapted to generate a steering assist force by a hydraulic pressure generated by a pump driven by an electric motor, comprises: steering angle detecting means for detecting a steering angle with respect to a steering angle midpoint; actuation control means for actuating the electric motor on condition that a change amount of the steering angle detected by the steering angle detecting means exceeds a predetermined actuation threshold in a motor stop state; and actuation threshold determining means for determining the actuation threshold in accordance with a value of the steering angle detected by the steering angle detecting means when the electric motor is stopped.

Where the steering angle has a value close to the steering angle midpoint, the steering angle changes by a relatively large change amount to get out of a play angle range of the steering wheel. That is, a large amount of the change in the steering angle is required until the steering assist becomes necessary. On the contrary, where the steering angle is relatively large, a great steering assist force is required immediately after the steering operation is started.

In the present invention, the actuation threshold is determined in accordance with the steering angle detected when the electric motor is stopped, and the electric motor is actuated on condition that the change amount of the steering angle exceeds the actuation threshold. Therefore, the actuation threshold can be set higher when the steering angle at the stop of the motor is close to the steering angle midpoint, and set lower when the steering angle (absolute value thereof) at the motor stop is relatively large. Thus, the electric motor is not actuated needlessly when the steering angle is close to the steering angle midpoint, and a great steering assist force can immediately be generated when the steering angle is large. Therefore, both the enhancement of the energy saving and the improvement of the sense of steering for the driver can be achieved.

The actuation control means may include actuation steering angle calculating means for determining, on the basis of the value of the steering angle detected by the steering angle detecting means and the actuation threshold determined by the actuation threshold determining means, an actuation steering angle which corresponds to a steering angle at which the electric motor in an off state is to be actuated; and means for actuating the electric motor, when the electric motor is off, on condition that the value of the steering angle detected by the steering angle detecting means reaches the actuation steering angle determined by the actuation steering angle calculating means.

Further, the actuation threshold determining means is preferably adapted to set the actuation threshold lower as the value of the steering angle detected by the steering angle detecting means at the motor stop increases.

In accordance with another embodiment of the present invention, the power steering apparatus further comprises vehicle speed detecting means for detecting a vehicle speed, and the actuation threshold determining means is adapted to set the actuation threshold higher as the vehicle speed detected by the vehicle speed detecting means increases.

Thus, immediate motor actuation is ensured at low speed traveling, and motor actuation sensitivity is reduced at high speed traveling. Therefore, needless actuation of the electric motor is prevented at a high traveling speed at which the steering assist is less necessary, while the steering assist is immediately started at a low traveling speed. This enhances the energy saving as well as the sense of steering control for the driver.

The foregoing and other objects, features and effects of the present invention will become more apparent from the following description of the embodiment with reference to the attached drawings.

BRIEF DESCRIPTION OF THE DRAWINGS

FIG. 3 is a flow chart illustrating an actuation steering angle calculating process for determining an actuation steering angle;

FIG. 5 is a diagram showing a relationship between the steering angle and the actuation steering angle;

FIG. 6 is a diagram for explaining a relationship between the motor actuation sensitivity and the vehicle speed;

FIG. 7 is a flow chart for explaining a motor stop range determining process.

EMBODIMENT OF THE INVENTION

Figure 1:
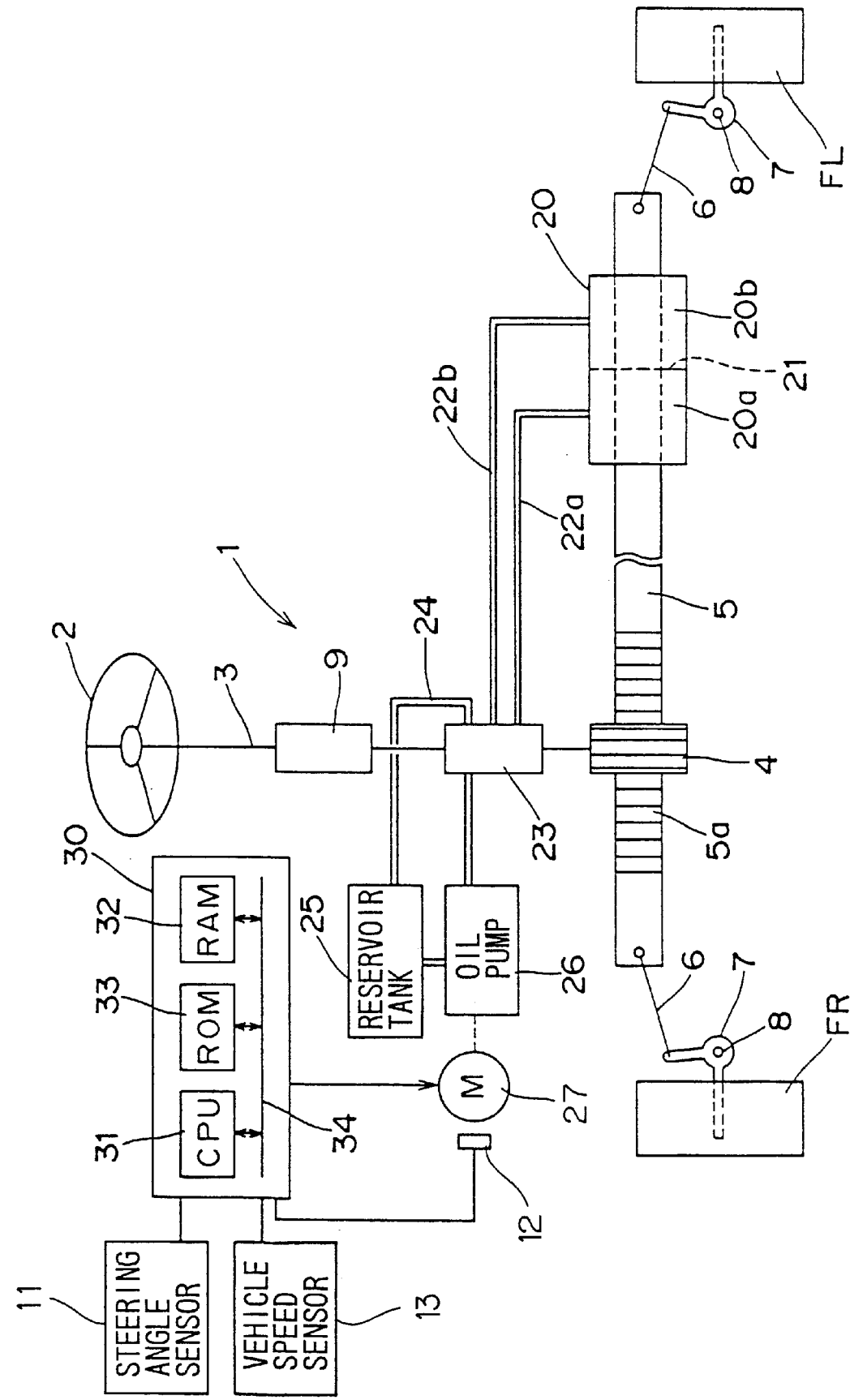
FIG. 1 is a conceptual diagram illustrating a basic construction of a power steering apparatus according to one embodiment of the present invention.

FIG. 1 is a conceptual diagram illustrating a basic construction of a power steering apparatus according to one embodiment of the present invention. This power steering apparatus is provided in association with a steering mechanism 1 of a motor vehicle for applying a steering assist force to the steering mechanism 1.

The steering mechanism 1 includes a steering wheel 2 that is operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels, FL and FR respectively as steerable wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions of the knuckle arms 7 about the king pins 8, thereby achieving the steering of the left and right front wheels FL, FR A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are incorporated in the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the cylinder 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24.

When the working oil is supplied to either one of the cylinder chambers of the power cylinder 20, the piston 21 moves transversely of the motor vehicle. Thus, a steering assist force acts on the rack shaft 5.

An exemplary construction of the hydraulic pressure control valve is disclosed in detail, for example, in Japanese Unexamined Patent Publication No. 59-118577 (1984), the disclosure of which is incorporated herein by reference.

The driving of the motor 27 is controlled by an electronic control unit 30. The electronic control unit 30 is comprised of a microprocessor which includes a CPU 31, a RAM 32 which provides a work area for the CPU 31, a ROM 33 storing therein operation programs for the CPU 31, and buses 34 interconnecting the CPU 31, the RAM 32 and the ROM 33.

The electronic control unit 30 receives steering angle data outputted from a steering angle sensor 11. The steering angle sensor 11 is provided in association with the steering wheel 2. The steering angle sensor 2 sets at an initial value "0" a steering angle of the steering wheel 2 observed when an ignition key switch is actuated for startup of an engine, and outputs steering angle data which has a value corresponding to a steering angle relative to the initial value and a sign corresponding to a steering direction.

The electronic control unit 30 also receives electric current data applied from an electric current detecting circuit 12 which detects electric current flowing through the motor 27. The electric current data has a value proportional to the value of a consumed electric current of the motor 27 (motor electric current).

Further, the electronic control unit 30 receives vehicle speed data outputted from a vehicle speed sensor 13. The vehicle speed sensor 13 may be adapted to directly detect a vehicle speed or, alternatively, adapted to calculate the vehicle speed on the basis of an output pulse of a wheel speed sensor provided in association with the wheels.

The electronic control unit 30 controls the driving of the motor 27 on the basis of the steering angle data, the electric current data and the vehicle speed data outputted from the steering angle sensor 11, the electric current detecting circuit 12 and the vehicle speed sensor 13, respectively.

Figure 2:
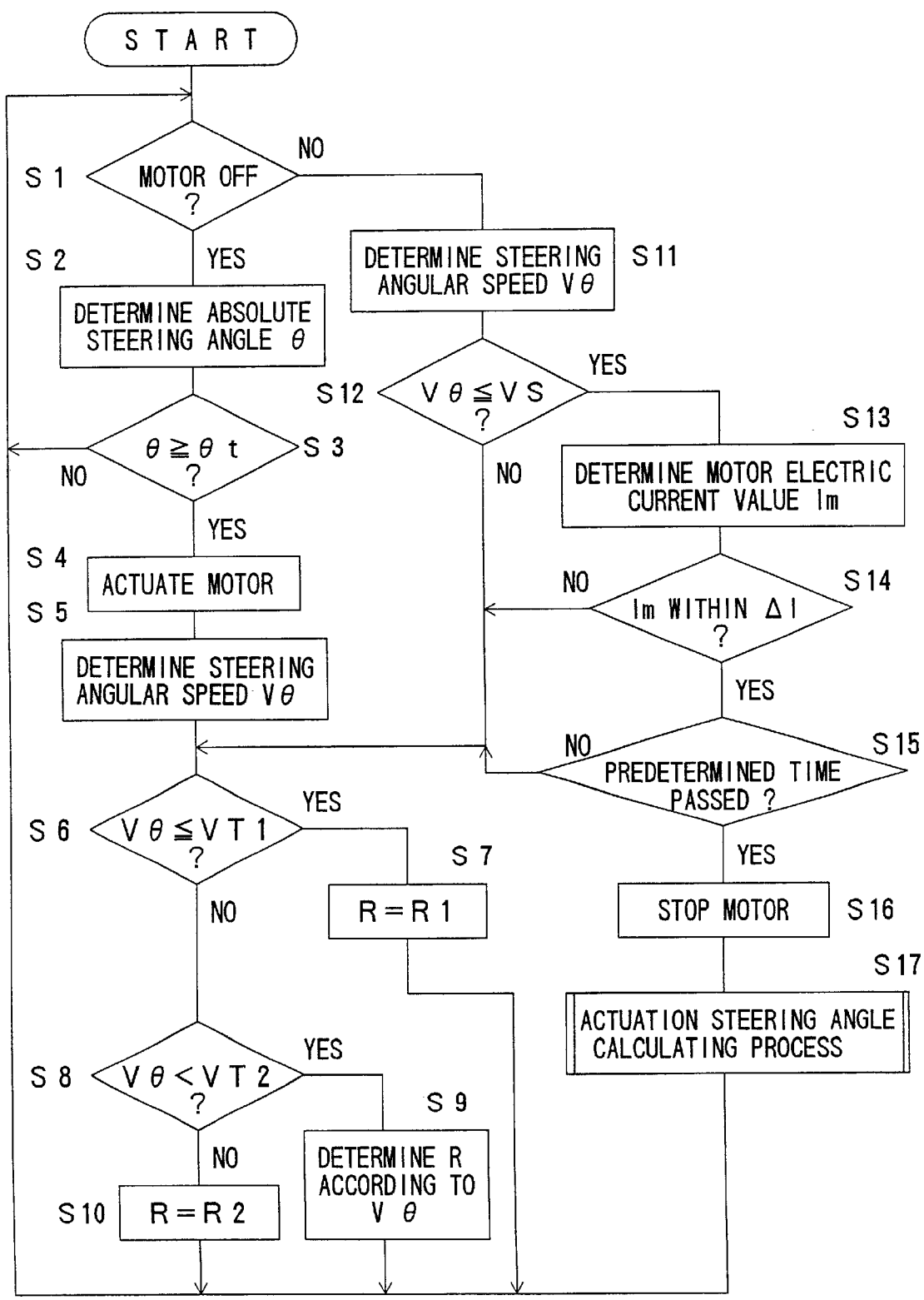
FIG. 2 is a flow chart for explaining drive control of a motor.

FIG. 2 is a flow chart for explaining the drive control of the motor 27. The CPU 31 first judges whether or not the motor 27 is off (Step S1). For this judgment, a flag may be employed, for example, which is to be set when the motor 27 is actuated and reset when the motor 27 is stopped.

If the motor 27 is in an off state (YES in Step S1), the CPU 31 calculates an absolute steering angle $\theta$ with respect to a steering angle midpoint $\theta 0$ on the basis of the steering angle data outputted from the steering angle sensor 11 (Step S2).

The steering angle midpoint $\theta 0$ is a steering angle of the steering wheel 2 observed when the motor vehicle travels straight. The CPU 31, for example, samples steering angle data outputted from the steering angle sensor 11 after the ignition key switch is actuated, and prepares a histogram of values of the steering angle data. After a predetermined number of data are sampled, the CPU 31 determines the most frequent steering angle data, which is regarded as steering angle data corresponding to the steering angle midpoint $\theta 0$. The steering angle data of the steering angle midpoint $\theta 0$ thus determined is stored in the RAM 32. In Step S2, the CPU 31 determines the absolute steering angle $\theta$ on the basis of the steering angle data from the steering angle sensor 11 and the steering angle data of the steering angle midpoint $\theta 0$ retained in the RAM 32.

The CPU 31 further judges whether or not the absolute steering angle $\theta$ thus determined is equal to or greater than an actuation steering angle $\theta t$ stored in the RAM 32 (Step S3). The actuation steering angle $\theta t$ corresponds to an absolute steering angle of the steering wheel 2 at which the motor 27 is to be actuated. The actuation steering angle $\theta t$ has been determined, through an actuation steering angle calculating process which will be described later, depending on the absolute steering angle observed at the preceding stoppage of the motor 27, and stored in the RAM 32.

The absolute steering angle $\theta$ and the actuation steering angle $\theta t$ are each provided, for example, with a positive sign if the angle is formed on the right of the steering angle midpoint $\theta 0$ or with a negative sign if the angle is formed on the left of the steering angle midpoint $\theta 0$. Strictly speaking, the judgment in Step S3 should be performed through comparison of the absolute values of the absolute steering angle $\theta$ and the actuation steering angle $\theta t$. For simplification of explanation, it is herein assumed that the absolute steering angle $\theta$ and the actuation steering angle $\theta t$ each have a positive value.

If it is judged that the absolute steering angle $\theta$ does not reach the actuation steering angle $\theta t$ (NO in Step S3), the program returns to Step S1. On the other hand, if the absolute steering angle $\theta$ reaches the actuation steering angle $\theta t$ (YES in Step S3), the CPU 31 actuates the motor 27 (Step S4).

The rpm of the motor 27 is determined in accordance with a steering angular speed $V\theta$ of the steering wheel 2. More specifically, the CPU 31 determines, on the basis of the steering angle data outputted from the steering angle sensor 11, the steering angular speed $V\theta$ which is a time-related change rate of the steering angle (Step S5). The CPU next judges whether or not the steering angular speed $V\theta$ thus determined is equal to or less than a predetermined first threshold VT1 (VT1=10 (degree/sec)) (Step S6). If the steering angular speed $V\theta$ is not greater than the first threshold VT1 (YES in Step S6), the motor 27 is driven so that the motor rpm R is equal to a predetermined first rpm R1 (e.g., R1=1800 (rpm)) (Step S7). That is, if the steering angular speed $V\theta$ is not greater than the first threshold VT1, the motor 27 is driven constantly at the first rpm R1 irrespective of the value of the steering angular speed $V\theta$.

If the steering angular speed $V\theta$ is greater than the first threshold VT1 (NO in Step S6), the CPU 31 judges whether or not the steering angular speed $V\theta$ is less than a second threshold VT2 (e.g., VT2=600 (degree/sec)) which is greater than the first threshold VT1 (Step S8). If the steering angular speed $V\theta$ is smaller than the second threshold VT2 (YES in Step S8), the CPU 31 drives the motor 27 at a motor rpm R according to the steering angular speed $V\theta$ (Step S9). More specifically, if the steering angular speed $V\theta$ is within a range which is greater than the first threshold VT1 and less than the second threshold VT2, the CPU 31 determines the motor rpm R so that the motor rpm R varies generally linearly with the steering angular speed $V\theta$ between the first rpm R1 and a second rpm R2 (R2>R1).

If the steering angular speed $V\theta$ is not less than the second threshold VT2 (NO in Step S8), the CPU 31 drives the motor 27 so that the motor rpm R is equal to the predetermined second rpm R2 (e.g., R2=6000 (rpm)) (Step S10). That is, if the steering angular speed Vθ is not less than the second threshold VT2, the motor 27 is driven constantly at the second rpm R2 irrespective of the steering angular speed Vθ.

If it is judged in Step S1 that the motor 27 is driven, the CPU 31 determines the steering angular speed Vθ on the basis of the steering angle data outputted from the steering angle sensor 11 (Step S11), and judges whether or not the steering angular speed Vθ thus determined is equal to or less than a predetermined stop threshold VS (e.g., VS=10 (degree/sec)) (Step S12). If the steering angular speed Vθ is greater than the stop threshold VS (NO in Step S12), the program goes to Step S6, and the CPU 31 determines the motor rpm R on the basis of the value of the steering angular speed Vθ, and drives the motor 27 at the motor rpm R thus determined.

If the steering angular speed Vθ is not greater than the stop threshold VS (YES in Step S12), the CPU 31 determines a motor electric current value Im on the basis of the electric current data outputted from the electric current detecting circuit 12 (Step S13). Then, it is judged whether or not the motor electric current value Im thus determined is within a motor stop range ΔI (Step S14). The motor stop range ΔI is a range of the motor electric current value Im where no steering assist is required, and is determined through a motor stop range determining process to be described later. If the motor electric current value Im is within the motor stop range ΔI (YES in Step S14), the CPU 31 judges whether or not the motor electric current value Im is kept within the motor stop range ΔI for a predetermined time period (e.g., 1 to 3 seconds) (Step S15). If this judgment is positive (YES in Step S15), the CPU 31 stops the motor 27 (Step S16) because the steering wheel 2 is considered to be virtually unoperated. Thereafter, the CPU 31 performs the actuation steering angle calculating process to determine the actuation steering angle θt (Step S17). On the other hand, if the judgments in Steps S14 and S15 are both negated, the CPU 31 performs the process sequence from Step S6 to determine the motor rpm R and drive the motor 27 at the rpm thus determined.

FIG. 3 is a flow chart showing the actuation steering angle calculating process. The CPU 31 determines the absolute steering angle θ at the stop of the motor on the basis of the steering angle data outputted from the steering angle sensor 11 (Step T1). Then, the CPU obtains a vehicle speed V on the basis of the vehicle speed data outputted from the vehicle speed sensor 13, and determines an actuation threshold dθ according to the vehicle speed V (Step T2). The actuation threshold dθ corresponds to a change amount of the steering angle which serves as a trigger for the actuation of the motor 27. That is, the motor 27 is actuated when the change amount of the steering angle reaches the actuation threshold dθ.

More specifically, the actuation threshold dθ is obtained by substituting into the following equation (1R) or (1L) a first constant A and a second constant B for the obtained vehicle speed V. The first constant A and the second constant B are factors for determining a sensitivity for the actuation of the motor 27, and a table indicative of a correlation between the vehicle speed V and the constants A and B is preliminarily stored in the ROM 33. The constant A is the maximum value of the actuation threshold dθ (absolute value thereof), and the constant B corresponds to the number of steering angle values which take the same actuation threshold dθ. When the steering angle sensor 11 is adapted to output a pulse for every turn by a given steering angle, for example, the steering angle θ may be expressed by the count value of a counter which is counted up or down by the pulse output. In such a case, the constant B may correspond to the number of count values which take the same actuation threshold dθ. It is noted that the constants A and B each have a positive value.

For right-turn steering (positive steering angle θ)

$$dθ = A - (θ/B) \tag{1R}$$

For left-turn steering (negative steering angle θ)

$$dθ = -A + (θ/B) \tag{1L}$$

When the vehicle speed V is zero, i.e., the vehicle stops, the actuation threshold dθ is not determined on the basis of the above equation (1R) or (1L) but set at a predetermined minimum actuation threshold.

The CPU 31 determines a first actuation steering angle θt1 by adding the actuation threshold dθ to the absolute steering angle θ at the motor stop determined in the aforesaid manner (Step T3). Where the motor 27 is off, the first actuation steering angle θt1 is an absolute steering angle at which the motor 27 is to be actuated when the steering wheel 2 is turned in such a direction that the absolute value of the absolute steering angle θ increases.

The CPU 31 determines, in addition to the first actuation steering angle θt1, a second actuation steering angle θt2 which is to be employed when the steering wheel 2 is turned in a direction opposite to the direction in which the absolute value of the absolute steering angle θ increases, i.e., in such a direction that the absolute value of the absolute steering angle θ (Step T4). More specifically, the second actuation steering angle is set at the same value as the maximum actuation threshold A or −A as shown in the following equations (2R) and (2L):

For right-turn steering (negative steering angle θ)

$$θt2 = A \tag{2R}$$

For left-turn steering (positive steering angle θ)

$$θt2 = -A \tag{2L}$$

The maximum actuation threshold A or −A is equal to the threshold dθ at θ=0, i.e., the threshold with respect to the steering angle midpoint. Therefore, when the steering operation is started from the steering angle midpoint or performed in the direction in which the absolute value of the absolute steering angle θ decreases, the motor 27 is actuated only when the steering operation is performed to get out of a so-called play angle range around the steering angle midpoint.

The CPU 31 stores the first and second actuation steering angles θt1 and θt2 thus determined in the RAM 32 (Step T5).

In FIG. 2, the first and second actuation steering angles θt1 and θt2 are generally designated as the actuation steering angle θt.

Figure 4A:
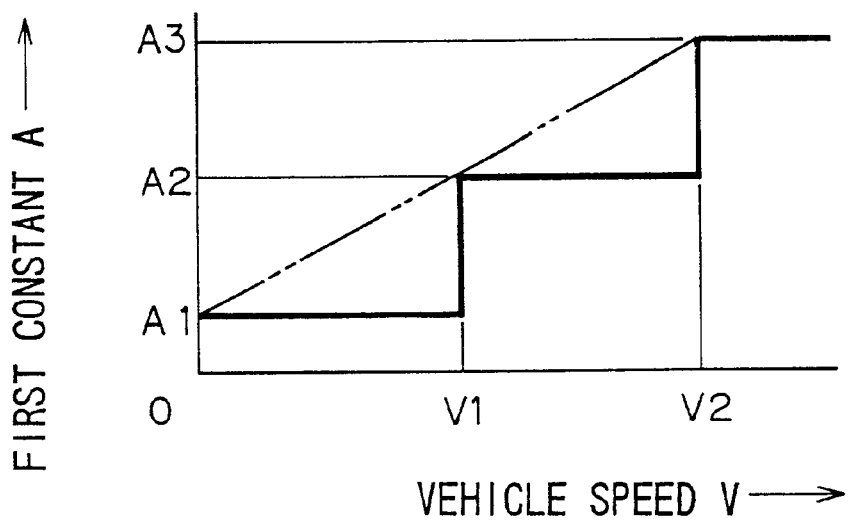
FIGS. 4A and 4B are diagrams for explaining exemplary setting of first and second constants.
Figure 4B:
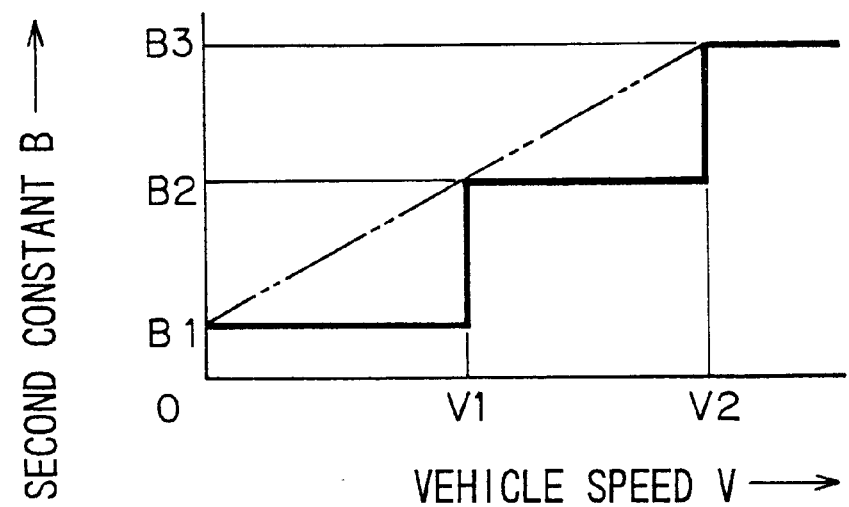

FIGS. 4A and 4B are diagrams for explaining the first constant A and the second constant B. The first constant A is determined for each predetermined vehicle speed range, and corresponds to the maximum value of the actuation threshold dθ to be determined for the corresponding vehicle speed range. More specifically, as shown in FIG. 4A, where the vehicle speed V is less than V1 (e.g., V1=30 (km/h)), the first constant A is set at A1 (e.g., A1=1). Where the vehicle speed is not less than V1 and less than V2 (e.g., V2=60 (km/h)), the first constant A is set at A2 (e.g., A2=3). Further, when the vehicle speed V is not less than V2, the first constant A is set at A3 (e.g., A3=6).

The second constant B is determined for each predetermined vehicle speed range, and corresponds to the number of the absolute steering angle values which take the same actuation threshold dθ for the corresponding vehicle speed range. More specifically, as shown in FIG. 4B, when the vehicle speed V is less than V1, the second constant B is set at B1 (e.g., B1=1). When the vehicle speed V is not less than V1 and less than V2, the second constant B is set at B2 (e.g., B2=2). Further, when the vehicle speed V is not lower than V2, the second constant B is set at B3 (e.g., B3=3).

The first constant A and the second constant B are not necessarily set in a stepwise form as shown in FIG. 4, but may be set as being linearly variable as indicated by two-dot-and-dash lines, for example, when the vehicle speed V is less than V2.

The actuation threshold dθ is set higher for a higher vehicle speed by setting the first constant A greater for a higher vehicle speed. Further, the decrease rate of the absolute value of the actuation threshold dθ with an increase in the absolute value of the absolute steering angle θ at the motor stop is reduced by setting the second constant B higher for a higher vehicle speed. Therefore, even if the absolute value of the absolute steering angle θ at the motor stop is relatively high, a relatively large amount of the change in the steering angle is required for the actuation of the motor 27. Thus, needless motor actuation is prevented when the vehicle speed is high. When the vehicle speed is low, the actuation sensitivity is increased, so that a steering assist force can immediately be generated.

FIG. 5 is a diagram showing a relationship between the absolute steering angle θ and the first actuation steering angle θt1, particularly, a relationship existing between the absolute steering angle θ and the first actuation steering angle θt1 when the first constant A and the second constant B are "5" and "3", respectively. In FIG. 5, the absolute steering angle θ at the motor stop is represented by the tail end of an arrow, the actuation threshold dθ is represented by the length of the arrow, and the first actuation steering angle θt1 is represented by the head of the arrow. Further, vertical lines represent absolute steering angles θ.

As apparent from FIG. 5, the actuation threshold dθ decreases as the value of the absolute steering angle θ at the motor stop increases. That is, the sensitivity for the actuation of the motor 27 increases as the value of the absolute steering angle θ at the motor stoppage increases. For the following reasons.

Where the absolute steering angle θ has a value close to the steering angle midpoint θ0, the steering assist is provided only when the steering wheel 2 is operated to get out of the play angle range of the steering wheel 2. Therefore, when the steering angle is close to the steering angle midpoint, excessive steering assist can be suppressed by setting the actuation threshold dθ higher, so that the energy saving can be enhanced. On the contrary, when the absolute steering angle θ has a high value, a satisfactory steering feeling can be ensured by immediately providing the steering assist.

FIG. 6 is a diagram for explaining a relationship between the sensitivity for the actuation of the motor 27 (which becomes higher as the absolute value of the actuation threshold dθ decreases) and the vehicle speed V. As apparent from FIG. 6, the sensitivity for the actuation of the motor 27 varies depending upon the vehicle speed V, even if the absolute steering angle θ at the motor stoppage has the same value. More specifically, the sensitivity for the actuation of the motor 27 is low at high speed traveling, and high at low speed traveling. This is because little steering assist force is required at the high speed traveling and the steering assist should immediately be provided at the low speed traveling.

When the motor vehicle stops with a vehicle speed V of zero, the actuation threshold dθ is set at the predetermined minimum value, so that the sensitivity for the actuation of the motor 27 is kept constant irrespective of the value of the absolute steering angle θ. Where a so-called parking steering operation is performed when the vehicle stops, a greater steering assist force is required and, therefore, it is preferred that the steering assist is immediately provided irrespective of the value of the absolute steering angle θ.

FIG. 7 is a flow chart for explaining the motor stop range ΔI determining process. The CPU 31 constantly monitors the motor electric current value Im (Step U1). On the basis of the motor electric current value Im, the CPU 31 determines a non-load electric current value I0 which corresponds to a motor electric current value observed when the motor 27 is in a non-load state (Step U2). Using the non-load electric current value I0 thus determined, the CPU 31 determines the motor stop range ΔI (Step U3). More specifically, the CPU 31 determines as the motor stop range ΔI a range defined between the non-load electric current value I0 thus determined and a value I0+dI resulting from summation of the non-load electric current value I0 and an electric current threshold dI which is predetermined in accordance with the specifications of the motor vehicle.

Figure 8:
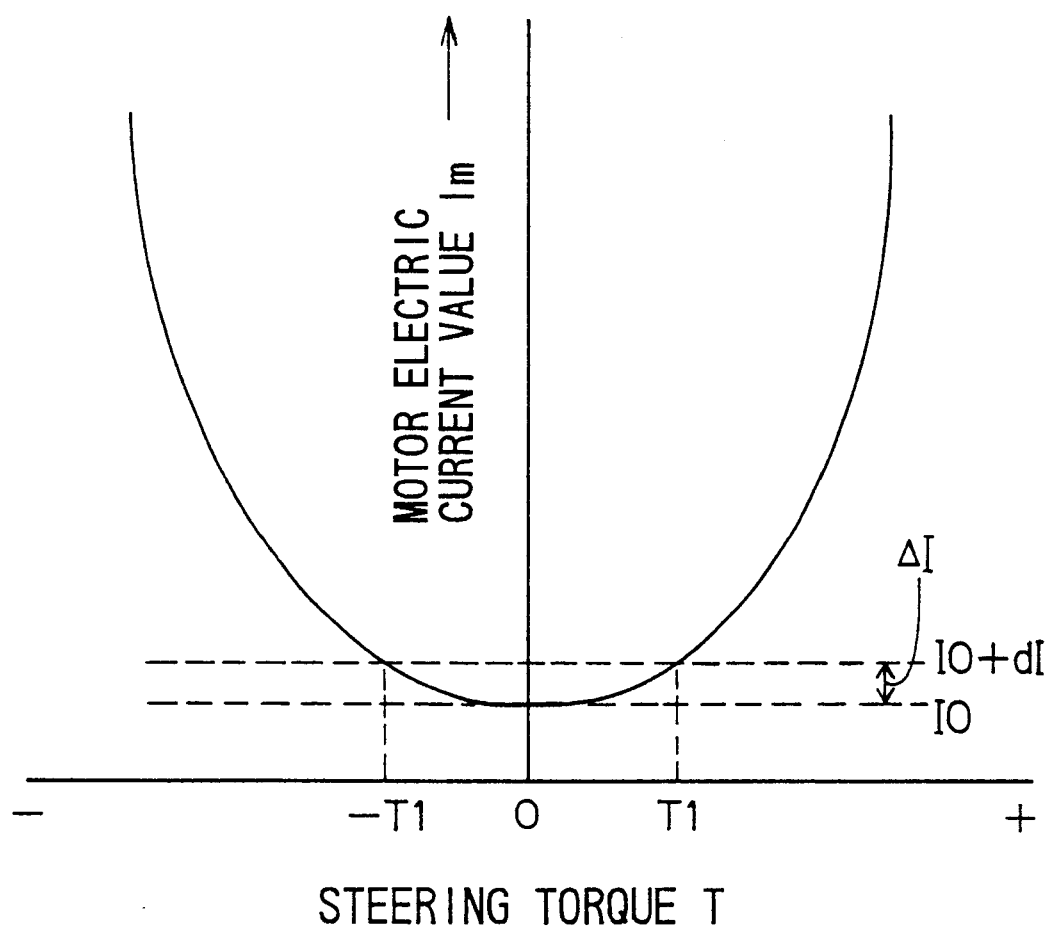
FIG. 8 is a graph showing a relationship between the motor electric current value and the steering torque.

FIG. 8 is a graph showing a relationship between the steering torque T and the motor electric current value Im. The abscissa and the ordinate represent the steering torque T and the motor electric current value Im, respectively. The motor electric current value Im in a range around a steering torque T of zero is expressed by a curve having a local point at T=0. When the steering torque T is zero, the motor 27 is in the non-load state and, therefore, the minimum value of the motor electric current value Im corresponds to the non-load electric current value I0.

On the other hand, a torque range where no steering assist force is required to be applied to the steering wheel 2 is determined by the specifications of the motor vehicle. Provided that the torque range is defined between torque thresholds T1 and −T1 with its midpoint set at zero, a difference between the non-load electric current value I0 and an electric current value for these torque thresholds T1, −T1 is preliminarily determined which is employed as the electric current threshold dI. The range defined between the non-load electric current value I0 and the value I0+dI obtained by adding the electric current threshold dI to the non-load electric current value I0 is considered to be the motor stop range ΔI where the steering wheel 2 is not operated. The electric current threshold dI is preliminarily determined for each type of motor vehicles, and stored in the ROM 33.

The non-load electric current value I0 varies mainly depending on the temperature of the working oil. More specifically, when the temperature of the working oil is low, for example, the working oil has a high viscosity, so that the load on the motor 27 is greater than when the temperature of the working oil is high. Therefore, the motor electric current value Im is high when the temperature of the working oil is low. That is, the Im-T curve in FIG. 8 is shifted upward with the non-load electric current value I0 being increased.

In this embodiment, therefore, the non-load electric current value I0 is calculated, and the range between the calculated non-load electric current value I0 and the value I0+dI resulting from the summation of the non-load electric current value I0 and the electric current threshold dI stored in the ROM 33 is defined as the motor stop range ΔI.

The calculation of the non-load electric current value I0 is achieved, for example, by determining the most frequent electric current value out of sampled motor electric current values Im. More specifically, the CPU 31 samples electric current data outputted from the electric current detecting circuit 12 over a predetermined time period (e.g., 10 (min) to 1 (hour)) on condition that the motor rpm R is kept constant. The motor electric current values Im determined on the basis of the electric current data obtained through the sampling have a normal distribution. In this case, a motor electric current value Im at a steering torque of zero is the most frequent electric current value, which is employed as the non-load electric current value I0.

Otherwise, the minimum electric current value, which is determined out of motor electric current values Im sampled by a predetermined number of times or during a predetermined time period on condition that the motor rpm R is kept constant, may be employed as the non-load electric current value I0.

In accordance with the embodiment described above, it is judged, on the basis of the motor electric current value Im, whether or not the steering assist is required, and the judgment result is employed as one condition for stopping the motor 27, in view of the fact that the motor electric current value Im varies depending upon the steering torque. Therefore, the drive control of the motor 27 can be performed in accordance with the steering torque even without the use of a torque sensor, so that an improved steering feeling can be ensured.

As the absolute value of the absolute steering angle θ at the motor stop increases, the sensitivity for the actuation of the motor 27 with respect to a change in the steering angle is increased. Therefore, needless motor actuation can be suppressed when the steering angle is close to the steering angle midpoint. In addition, when the steering angle θ is large, a steering assist force can immediately be generated. Thus, the energy saving can be enhanced, and catch-up feeling of the steering wheel can be eliminated.

Further, the sensitivity for the actuation of the motor 27 is increased at the low speed traveling which requires a greater steering assist force, while the actuation sensitivity is reduced at the high speed traveling. Hence, the enhancement of the energy saving and the improvement of the steering feeling can both be ensured.

Industrial Applicability

As previously described, the power steering apparatus according to the present invention is used for applying a steering assist force to a steering mechanism of a motor vehicle.

What is claimed is:

1. A power steering apparatus, for generating a steering assist force by a hydraulic pressure generated by a pump driven by an electric motor, comprising:
   steering angle detecting means for detecting a steering angle with respect to a steering angle midpoint;
   actuation threshold determining means for determining an actuation threshold in accordance with the steering angle detected by the steering angle detecting means when the electric motor is stopped; and
   actuation control means for actuating the electric motor when a change amount of the steering angle detected by the steering angle detecting means exceeds a predetermined actuation threshold in a motor stop state, the actuation control means comprising:
   actuation steering angle calculating means for determining, on the basis of the value of the steering angle detected by the steering angle detecting means and the actuation threshold determined by the actuation threshold determining means, an actuation steering angle which corresponds to a steering angle at which the electric motor in an off state is actuated, and
   means for actuating the electric motor, when the electric motor is off, when the value of the steering angle detected by the steering angle detecting means reaches the actuation steering angle determined by the actuation steering angle calculating means;
   wherein the actuation threshold determining means sets the actuation threshold smaller as the value of the steering angle detected by the steering angle detecting means increases when the electric motor is stopped.

2. A power steering apparatus as set forth in claim 1, further comprising
   vehicle speed detecting means for detecting a vehicle speed,
   wherein the actuation threshold determining means sets the actuation threshold greater as the vehicle speed detected by the vehicle speed detecting means increases.

3. A power steering apparatus as set forth in claim 1, further comprising
   vehicle speed detecting means for detecting a vehicle speed,
   wherein the actuation threshold determining means sets the actuation threshold greater as the vehicle speed detected by the vehicle speed detecting means increases.

4. A power steering apparatus for generating a steering assist force by a hydraulic pressure generated by a pump driven by an electric motor, comprising:
   steering angle detecting means for detecting a steering angle with respect to a steering angle midpoint;
   actuation control means for actuating the electric motor when a change amount of the steering angle detected by the steering angle detecting means exceeds a predetermined actuation threshold in a motor stop state; and
   actuation threshold determining means for determining the actuation threshold in accordance with the steering angle detected by the steering angle detecting means when the electric motor is stopped,
   wherein the actuation threshold determining means sets the actuation threshold smaller as the value of the steering angle detected by the steering angle detecting means increases when the electric motor is stopped.

* * * * *